United States Patent
Regensburger et al.

(10) Patent No.: US 10,656,102 B2
(45) Date of Patent: May 19, 2020

(54) EVALUATING SYSTEM PERFORMANCE WITH SPARSE PRINCIPAL COMPONENT ANALYSIS AND A TEST STATISTIC

(71) Applicant: Battelle Memorial Institute, Columbus, OH (US)

(72) Inventors: Joe Regensburger, Grove City, OH (US); Douglas Mooney, Columbus, OH (US); Laura Aume, Circleville, OH (US); Amir Rahimi, Powell, OH (US); Joe Cochran, Egg Harbor Township, NJ (US)

(73) Assignee: Battelle Memorial Institute, Columbus, OH (US)

( * ) Notice: Subject to any disclaimer, the term of this patent is extended or adjusted under 35 U.S.C. 154(b) by 377 days.

(21) Appl. No.: 14/919,957

(22) Filed: Oct. 22, 2015

(65) Prior Publication Data

US 2017/0115238 A1   Apr. 27, 2017

(51) Int. Cl.
*G06F 17/18* (2006.01)
*G01N 23/046* (2018.01)
*G06K 9/62* (2006.01)

(52) U.S. Cl.
CPC ........... *G01N 23/046* (2013.01); *G06F 17/18* (2013.01); *G06K 9/6247* (2013.01);
(Continued)

(58) Field of Classification Search
CPC ........... G01N 23/046; G01N 2223/302; G01N 2223/419; G06F 17/18; G06K 9/6265;
(Continued)

(56) References Cited

U.S. PATENT DOCUMENTS

| 5,442,562 A | 8/1995 | Hopkins et al. |
| 7,243,048 B2 | 7/2007 | Foslien et al. |

(Continued)

FOREIGN PATENT DOCUMENTS

| CN | 101833330 A | 9/2010 |
| CN | 104062968 A | 9/2014 |
| WO | 2003083757 A2 | 10/2003 |

OTHER PUBLICATIONS

Johnstone et al., "Sparse Principal Components Analysis," Stanford University and Renaissance Technologies, pp. 1-29.*

(Continued)

*Primary Examiner* — Mohamed Charioui
*Assistant Examiner* — Eyob Hagos
(74) *Attorney, Agent, or Firm* — Benesch, Friedlander, Coplan & Aronoff LLP

(57) ABSTRACT

A method for evaluating system performance can include comparing a test average of instances of variables of test system variables to a baseline average of a baseline variables. Each of the instances of the variable of the test system variables may be shifted by a shift amount for a subset of the variables. A modified test data set may be generated from the shifted test data set. The modified test data set may be transformed with a sparse principal component analysis into test components. The test components may be compared to baseline components using a Hotelling $T^2$ as a test statistic. Performance of the system may be quantified based upon the test statistic.

19 Claims, 5 Drawing Sheets

(52) U.S. Cl.
CPC ......... *G06K 9/6249* (2013.01); *G06K 9/6265* (2013.01); *G01N 2223/302* (2013.01); *G01N 2223/419* (2013.01); *G06K 2209/09* (2013.01)

(58) Field of Classification Search
CPC . G06K 9/6249; G06K 9/6247; G06K 2209/09
See application file for complete search history.

(56) References Cited

U.S. PATENT DOCUMENTS

| | | | |
|---|---|---|---|
| 7,328,126 B2 | 2/2008 | Chamness | |
| 8,306,778 B2 | 11/2012 | Leao et al. | |
| 2005/0096873 A1* | 5/2005 | Klein | G01H 1/006 702/184 |
| 2008/0123815 A1* | 5/2008 | Feda | G01N 23/223 378/112 |
| 2009/0308052 A1* | 12/2009 | Zhang | F01N 9/002 60/274 |
| 2010/0183124 A1 | 7/2010 | Liu et al. | |
| 2010/0242001 A1* | 9/2010 | Reddy | G06F 17/5036 716/136 |
| 2011/0222781 A1* | 9/2011 | Nguyen | G06K 9/6244 382/218 |
| 2014/0073938 A1* | 3/2014 | Rodriguez-Llorente | A61B 5/7203 600/476 |
| 2014/0136146 A1* | 5/2014 | McCready | G01M 99/00 702/179 |

OTHER PUBLICATIONS

Sparse Principal Component Analysis, available at: http://web.stanford.edu/~hastie/Papers/spc_jcgs.pdf, accessed on Jan. 25, 2016.
Hotelling's T-squared distribution, available at: https://en.wikipedia.org/wiki/Hotelling%27s_T-squared_distribution, accessed on Jan. 25, 2016.
Principal component analysis, available at: https://en.wikipedia.org/wiki/Principal_component_analysis, accessed on Jan. 25, 2016.
International Search Report and the Written Opinion of the International Searching Authority in related PCT Application No. PCT/US16/57815 dated Jan. 13, 2017, 15 pages.

* cited by examiner

EVALUATING SYSTEM PERFORMANCE WITH SPARSE PRINCIPAL COMPONENT ANALYSIS AND A TEST STATISTIC

GOVERNMENT LICENSE RIGHTS

This invention was made with government support under the Department of Homeland Security/Transportation Security Administration, Contract No. HTS04-10-D-ST3006. The government has certain rights in the invention.

BACKGROUND

A determination of system performance for a complex system may involve the determination and evaluation of large number of metrics or system variables. The system variables of an evaluated system may be compared to the system variables of a baseline system using statistical methods. For example, the statistical method may generate a pass or fail criteria. However, standard statistical methods may generate an unreliable pass fail or fail criteria, in particular when evaluating a large number of system variables. For example, the standard statistical methods may generate noisy pass or fail criteria, i.e., the response of the pass or fail criteria to known faults may be unpredictable. Moreover, the standard statistical methods may lead to an unacceptable number of erroneous failures.

The present application appreciates that evaluating system performance may be a challenging endeavor.

SUMMARY

In one embodiment, a method for evaluating system performance may include collecting test measurements of a calibration standard with a sensor of a system. The test measurements may be transformed, automatically with one or more processors, into a test data set. The test data set may include instances of test system variables. Each of the instances of the test system variables may correspond to the test measurements. A test average of the instances of a variable of the test system variables may be compared to a baseline average of a baseline variable, automatically with the one or more processors. A shift amount may be determined based upon the test average and the baseline average. Each of the instances of the variable of the test system variables may be shifted by the shift amount, i.e., for a subset of the test system variables. A modified test data set may be generated from the shifted test data set. The modified test data set can be transformed, automatically with the one or more processors, with a sparse principal component analysis (SPCA) into test components. The test components can be compared to baseline components using a Hotelling $T^2$ test, automatically with the one or more processors. A test statistic can be generated by the Hotelling $T^2$ test. Performance of the system can be quantified based upon the test statistic. Alternatively or additionally, the shifted variables of the modified test data set can have substantially the same mean as the corresponding variables in the baseline data set.

In another embodiment, a method for evaluating system performance may include providing a test data set. The test data set may include instances of test system variables. Each of the instances of the test system variables may correspond to test measurement. A variable of the test system variables may be selected, automatically with one or more processors, when the variable of the test system variables is indicative of improved quality, or when a test average of the instances of the variable of the test system variables differs from a baseline average by less than a practically significant difference. A shift amount may be determined based upon the test average and the baseline average. Each of the instances of the variable of the test system variables may be shifted, automatically with the one or more processors, by the shift amount to generate a modified test data set. The modified test data set may be transformed, automatically with the one or more processors, with a sparse principal component analysis into test components. The test components may be compared, automatically with the one or more processors, to baseline components using a Hotelling $T^2$ test to generate a test statistic. Performance of the system may be quantified based upon the test statistic.

In a further embodiment, a system capable of evaluating system performance may include a sensor and memory communicatively coupled to one or more processors. The memory may include machine readable instructions that are executed by the one or more processors to collect test measurements of a calibration standard with the sensor. The test measurements may be transformed into a test data set. The test data set may include instances of test system variables. Each of the instances of the test system variables may correspond to the test measurements. A test average of the instances of a variable of the test system variables may be compared to a baseline average of a baseline variable. A shift amount may be determined based upon the test average and the baseline average. Each of the instances of the variable of the test system variables may be shifted by the shift amount to generate a modified test data set from the test data set. The modified test data set may be transformed with a sparse principal component analysis into test components. The test components may be compared to baseline components using a Hotelling $T^2$ test to generate a test statistic. Performance of the system may be quantified based upon the test statistic.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments may be understood when read in conjunction with the following drawings, where like structure is indicated with like reference numerals and in which:

DETAILED DESCRIPTION

The present specification generally relates to systems and methods for evaluating system performance and, more specifically, to systems and methods for evaluating system performance using component analysis and a test statistic.

The embodiments described herein generally relate to computerized systems and methods for evaluating the performance of a system such as, but not limited to, an X-ray computed tomography (CT) system or other detection system. For example, the performance of the system may be quantified by a test statistic that is indicative of the performance of an output generated by the system such as, but not limited to, image quality of the detection system. In some embodiments, the test statistic may be evaluated or generated using a plurality of system variables. Specifically, test results may be compared to baseline measurements for each of the system variables. Various embodiments of the system and the method for evaluating system performance will be described in more detail herein.

Figure 1:
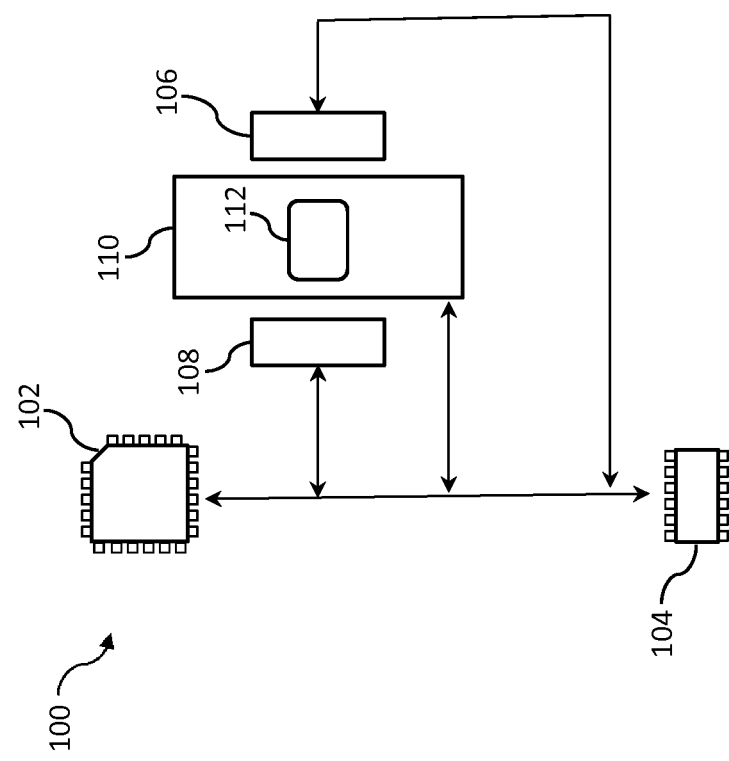
FIG. 1 is a schematic depicting a system for evaluating system performance according to one or more embodiments shown and described herein.

Referring now to FIG. 1, a system 100 may be configured to collect data indicative of a test article. The system 100 may include one or more processors 102 for executing machine readable instructions and memory 104 for storing the machine readable instructions. The one or more processors 102 may be communicatively coupled to the memory 104. The one or more processors 102 may include an integrated circuit, a microchip, a computer, or any other computing device capable of executing machine readable instructions. The memory 104 may include RAM, ROM, a flash memory, a hard drive, or any device capable of storing machine readable instructions. As used herein, the phrase "communicatively coupled" may mean that components are capable of exchanging data signals with one another such as, for example, electrical signals via conductive medium, electromagnetic signals via air, optical signals via optical waveguides, and the like.

Thus, embodiments of the present disclosure may include logic or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either a field-programmable gate array (FPGA) configuration or an application-specific integrated circuit (ASIC), and their equivalents.

The system 100 may include a sensor 106 for collecting measurements of a test article. The sensor 106 may be communicatively coupled to the one or more processors 102, the memory 104, or both. It is noted that the term "sensor," as used herein, may mean a device that measures a physical quantity and converts it into a signal, which is correlated to the measured value of the physical quantity. In some embodiments, the system 100 may be configured as an X-ray CT system such as, but not limited to, an X-ray CT Explosives Detection System (EDS). Accordingly, the sensor 106 may be an X-ray detector that is configured to detect photons such as, for example, a point detector, a linear detector, or a planar detector.

In some embodiments, the system 100 may include a source 108 that is configured to generate excitation energy that is detectable by the sensor 106. The sensor 108 may be communicatively coupled to the one or more processors 102, the memory 104, or both. In embodiments where the system 100 is configured as an X-ray CT system, the source 106 may be an X-ray source configured to emit photons along a path. Specifically, the path may begin at the source 108 and terminate at the sensor 106. Generally, the test article is placed along the path and between the source 108 and the sensor 106 such that a portion of the photons are absorbed by the test article while measurements are collected by the system 100.

Referring still to FIG. 1, the system 100 may include an actuation assembly 110 configured to manipulate the test article, the sensor 106, the source 108, or a combination thereof. Accordingly, the actuation assembly 110 may include one or more servo-mechanism for providing a controlled amount of force for manipulating the test article, the sensor 106, the source 108, or a combination thereof. In the embodiments described herein, the one or more processors 102, the memory 104, or both may be integral with any or all of the sensor 106, the source 108, and the actuation assembly 110. However, it is noted that the one or more processors 102, the memory 104, or both may be separate components communicatively coupled with one another without departing from the scope of the present disclosure.

In some embodiment, the actuation assembly 110 may include a mechanical actuator, a hydraulic actuator, a pneumatic actuator, an electrical actuator, or combinations thereof. The actuation assembly 110 may be communicatively coupled to the one or more processors 102, the memory 104, or both. In some embodiments, the one or more processors 102 may execute machine readable instructions to direct the operation of the sensor 106, the source 108, and the actuation assembly 110. For example, actuation assembly 110 may include a conveyer system for moving test articles throughout the system 100. Alternatively or additionally, the actuation assembly may be configured to cause relative motion of the test article with respect to the sensor 106.

In embodiments where the system 100 is configured as an X-ray CT system, multiple measurements of the test article may be collected by the sensor 106 while the test article moves with respect to the sensor 106, the source 108, or both. Each measurement may be constructed into an image having greater dimensional complexity than the measurement generated by the sensor 106. For example, each measurements may be indicative of absorption or density of the test article that may be constructed into an image indicative of both the internal and external features of the test article. Specifically, measurements collected by a line detector may be used to produce a two-dimensional image showing a slice of the test article depicting both internal and external features. A plurality of slices may be combined to produce a full representation of the internal and external features of a three-dimensional object such as, for example, by combining slices collected along a direction orthogonal to the plane of the slices. Measurements collected by a planar detector may be constructed into a three-dimensional image of the test article. It is to be understood that, while particular variations and principles may be discussed herein with regard to X-ray CT techniques, any suitable sensing technique may be used with the present disclosure. Indeed, the embodiments described herein may be applied to evaluate system performance of any system where data preprocessing may produce a standardized table of system variables or metrics. It should further be understood that, unless otherwise stated, reference to imaging or to an imaging machine includes optical imaging devices, Magnetic Resonance Imaging (MRI), X-ray CT, and any other applicable scanning or imaging technique or machine.

As is explained in greater detail herein, system performance may be quantified by comparing tests measurements to baseline measurements. In some embodiments, measurements may be collected using a calibration standard 112 as the test article. It is note that, while the embodiments described herein may use the calibration standard 112, multiple test articles that are substantially the same as the calibration standard 112 may be used to generate tests measurements and/or baseline measurements. The calibration standard 112 may be an object with standardized or predefined features that are detectable by the sensor 106. System variables may be derived from the measurements of the calibration standard 112. Specifically, in the case of X-ray CT EDS, two calibration standards ("test article A" and "test article B") are defined by IEEE Standards Association, American National Standard for Evaluating the Image Quality of X-ray Computed Tomography (CT) Security-Screening Systems (2011), hereinafter the "ANSI N42.45-2011 standard." The ANSI N42.45-2011 standard, which is incorporated herein by reference, further defines seventy eight (78) individual image quality metrics of X-ray images. Each image quality metric may be used as a system variable, according to the embodiments described herein.

Figure 2:
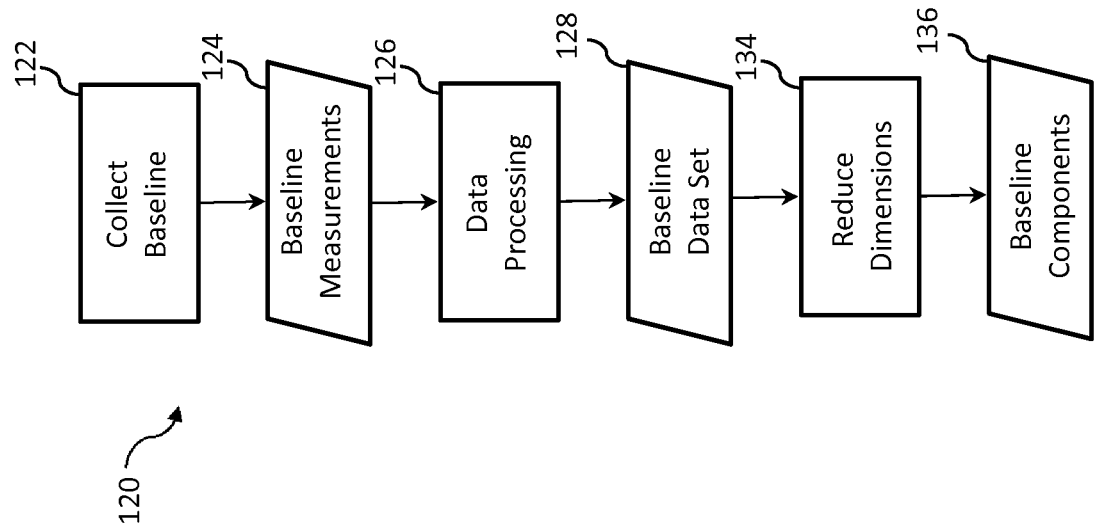
FIG. 2 is a schematic depicting a method for collecting baseline data according to one or more embodiments shown and described herein.

Referring collectively to FIGS. 1 and 2, a method 120 may be configured to establish baseline data. The method 120 may include a process 122 for collecting baseline measurements 124. For example, the sensor 106 of the system 100 may collect one or more measurements of the calibration standard 112. Alternatively or additionally, the baseline measurements 124 may include system parameters such as, for example, voltage, current, belt speed, temperature, humidity, or any other metric of the system detected by one or more additional sensors. In some embodiments, multiple additional baseline systems may be used to collect measurements of the calibration standard 112. Generally, the baseline measurements 124 may correspond to baseline systems in good working order or baseline systems with known levels of performance. Accordingly, the baseline measurements 124 may correspond to a predefined level of system performance.

Figure 3:
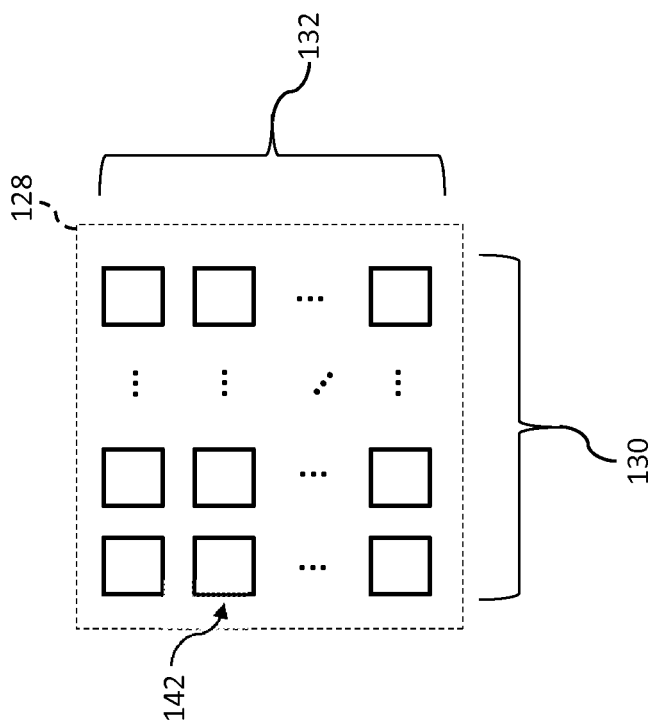
FIG. 3 is a schematic depicting a baseline data set according to one or more embodiments shown and described herein.

Referring collectively to FIGS. 2 and 3, the method 120 may include a process 126 for processing or transforming the baseline measurements 124 into a baseline data set 128. In some embodiments, the baseline data set 128 may include multiple instances 130 of baseline system variables 132. Each instance 130 may correspond to the baseline measurements 124. For example, in some embodiments, an instance 130 may correspond to a single measurement instance, i.e., a single image or single measurement of the calibration article. Alternatively or additionally, an instance 130 may correspond to a combination of measurement instances, i.e., an average of images or an average of measurements of the calibration standard 112. It is noted that the baseline data set 128 is provided in matrix notation in FIG. 3, where each row corresponds to one of the baseline system variables 132 and each column corresponds to an instance 130.

At process 126, the features of the calibration standard 112 may be detected from the baseline measurements 124. The detected features may be used to derive the baseline system variables 132 of the baseline data set 128. For example, each feature may be quantified, the relative positioning of the features may be quantified, regions of interest may be quantified, statistical metrics (e.g., mean, standard deviation, maximum, minimum, median, and the like) may be derived using one or more features and/or regions of interest, and the like. For example, in embodiments where the baseline measurements 124 include X-ray data, the baseline system variables 132 may include a variable derived from an X-ray image. Specifically, the ANSI N42.45-2011 standard defines multiple image quality metrics that may be used as one or more of the baseline system variables 132.

Figure 4:
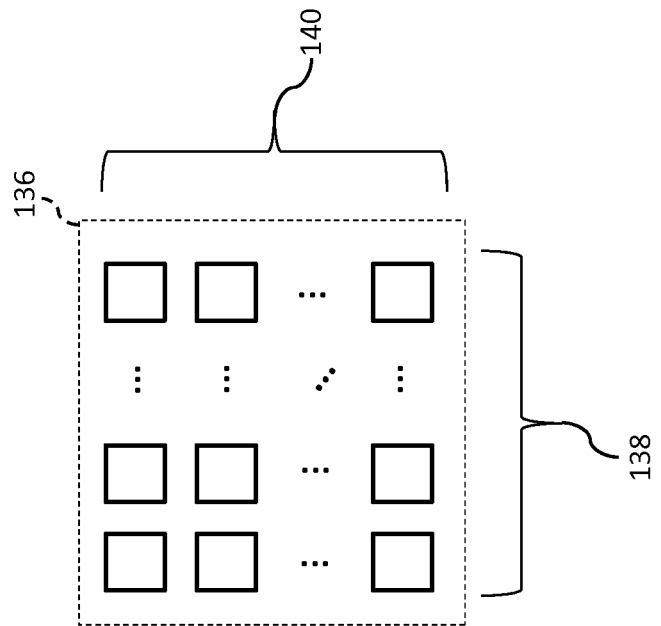
FIG. 4 is a schematic depicting a baseline components according to one or more embodiments shown and described herein.

Referring collectively to FIGS. 2, 3, and 4, at process 134, the baseline data set 128 may be transformed into baseline components 136 having reduced dimensionality than the baseline data set 128. For example, the baseline data set 128 may be input into Principal Component Analysis (PCA) or a Sparse Principal Component Analysis (SPCA) to generate the baseline components 136. The PCA may transform the baseline data set 128 into the baseline components 136 having principal components 138, which are a linear combination of each of the baseline system variables 132. The linear combination may be represented by baseline loading 140. Specifically, when represented in matrix notation, each column of the baseline components 136 may correspond to one of the principal components 138, and each row of the baseline components 136 may correspond to the baseline loading 140 of a corresponding baseline system variable 132. The dimensionality may be reduced, when the total number of principal components 138 is less than the number of the baseline system variables 132. Generally, the principal components 138 generated by the PCA are not correlated with one another. One issue with PCA is that each of the principal components 138 is a linear combination of all of the system variables, i.e., non-zero loading. Accordingly, it may be difficult to determine which of the system variables is responsible for an observed response. Without being bound to theory, it is believed that more meaningful components may be identified when all but the important loadings are zero.

SPCA refines PCA by using regularization methodology, which is designed to make most of the baseline loadings 140 of the baseline components 136 have a value of zero. IN one embodiment, the regularization methodology may include imposing lasso (i.e., an elastic net) constraint on the regression coefficients. The baseline system variables 132 contributing to each of the baseline principal components 138 are sparse (i.e., fewer variables than the PCA). The baseline loadings 140 having both zero and non-zero weights may enable an better interpretation of the meaning of key components than the PCA approach. The baseline principal components 138 of the SPCA are not strictly un-correlated, but the degree of correlation is low.

Figure 5:
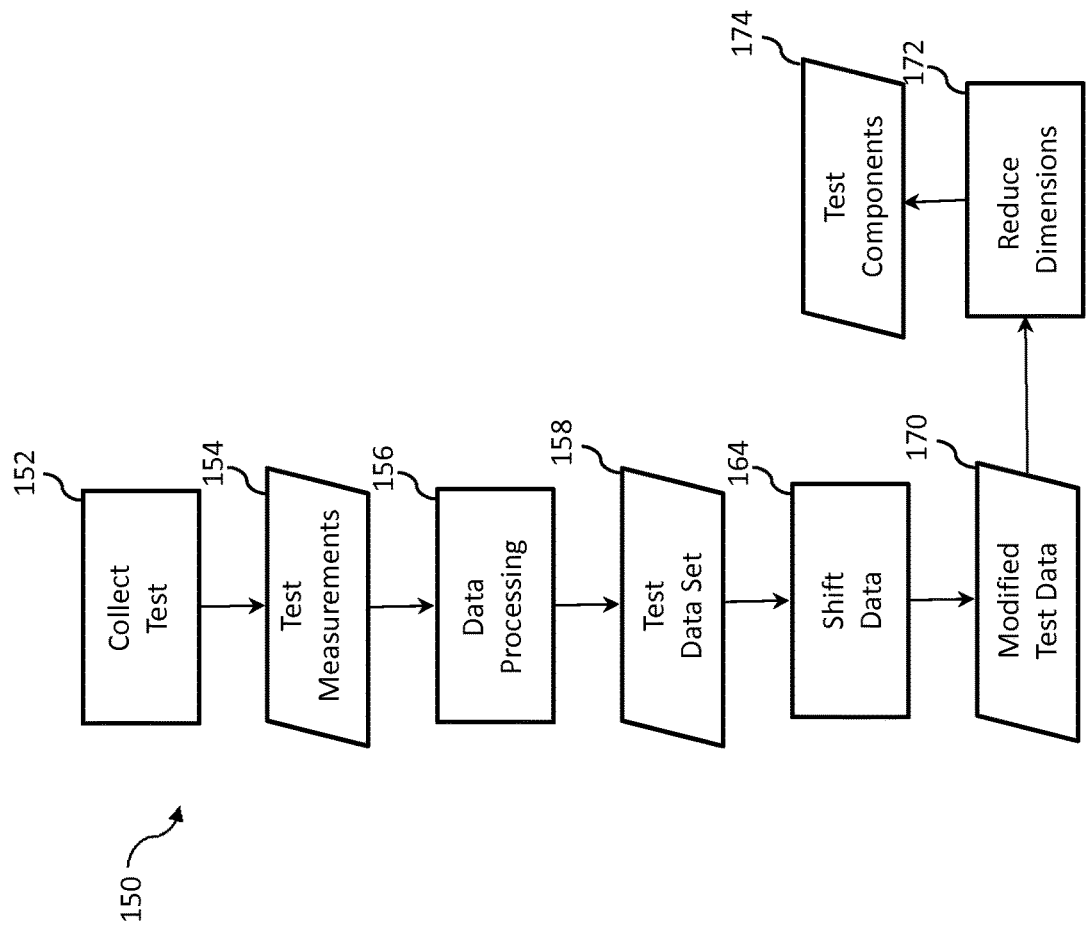
FIG. 5 is a schematic depicting a method for collecting test data according to one or more embodiments shown and described herein.

Referring collectively to FIGS. 1, 2, and 5, according to the embodiments described herein, a method 150 may be configured to characterize a test performed by the system 100. The method 150 may include a process 152 for collecting test measurements 154. The process 152 may operate as described above with respect to process 122. In some embodiments, the process 152 may be configured to collect measurements of the calibration standard 112 such that the test measurements 154 correspond to substantially the same data as the baseline measurements 124. Thus, the differences between the test measurements 154 and the baseline measurements 124 may be attributed to the differences in the systems or data collection processes. Alternatively or additionally, the test measurements 154 may be collected using the sensor 106 of a system with unknown performance. Accordingly, as explained in greater detail herein, the baseline components 136 may be used to characterize the unknown system performance of the test system.

Referring collectively to FIGS. 1, 2, 3, 5, and 6, the method 150 may include a process 156 for processing or transforming the test measurements 154 into a test data set 158, which includes multiple instances 160 of test system variables 162. In some embodiments, an instance 160 may correspond to a single measurement instance, i.e., a single image or single measurement of the calibration article 112. The process 156 may operate as described above with respect to process 126, such that test system variables 162 correspond to the same type of variable as one of the baseline system variables 132. Accordingly, since the calibration article 112 is used, the test system variables 162 may provide a direct comparison with the baseline system variables 132 that may be indicative of the performance of the test system compared to the baseline systems.

The method 150 may further include a process 164 for shifting data and transforming the test data set 158 into a modified test data set 170. As is explained in greater detail herein, the shift may be used constrain the test statistic to practically meaningful differences that correspond to a degraded performance. At process 164, one or more of the test system variables 162 may be identified for shifting. Specifically, the test data set 158 may include an identified test variable 166 of the test system variables 162 that corresponds to the same type of measurement as a corresponding baseline variable 142 of the baseline system variables 132. A test average of the instances 160 of the identified test variable 166 may be compared to a baseline average of the instances 130 of the corresponding baseline variable 142 to determine a shift amount. In some embodiments, the shift amount may correspond to the delta between the test average and the baseline average. At process 164, each of the instances 160 of the identified test variable 166 of the test system variables 162 may be shifted by the shift amount. For example, the shift amount may be applied to each instance 160 such that the test average and the baseline average are substantially the same. Accordingly, the modified test data set 170 may be generated from the test data set 158 in a manner that preserves the variation of the test data set 158 in the modified test data set 170, while substantially eliminating the variation in the means. Without being bound to theory, it is believed that the preservation of the variation and elimination of the mean may improve the effectiveness of a statistical comparison between the baseline and the tests.

Figure 7:
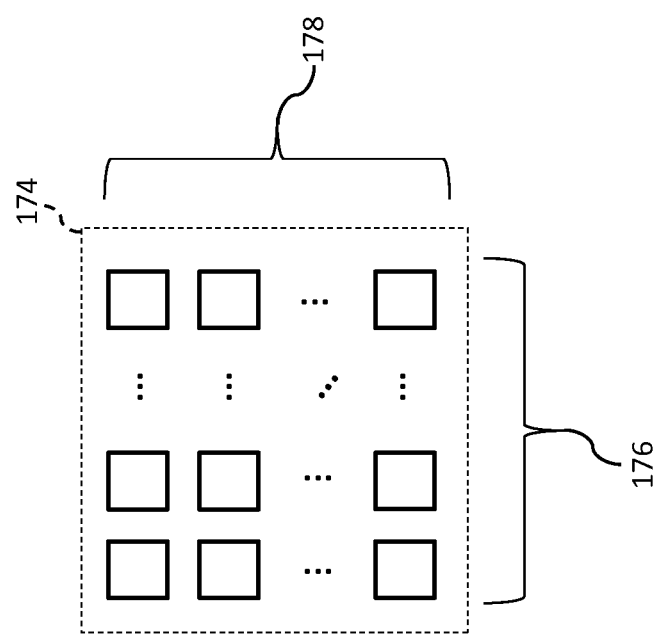
FIG. 7 is a schematic depicting test components according to one or more embodiments shown and described herein.

Referring collectively to FIGS. 2, 5, and 7, at process 172, the modified test data set 170 may be transformed into test components 174 having reduced dimensionality than the modified test data set 170. The process 172 may employ a PCA or an SPCA to generate the test components 174. Generally, the same transformation is used in both process 172 and process 134, in order to facilitate comparison between the baseline components 136 and the test components 174. As is noted above, the use of the SPCA for the transformation may identify less significant system variables through zero loading and more significant system variables through non-zero loading. Accordingly, the use of the SPCA may improve the functioning of the methods providing herein when evaluating complex systems that are described by a large number of system variables.

Figure 8:
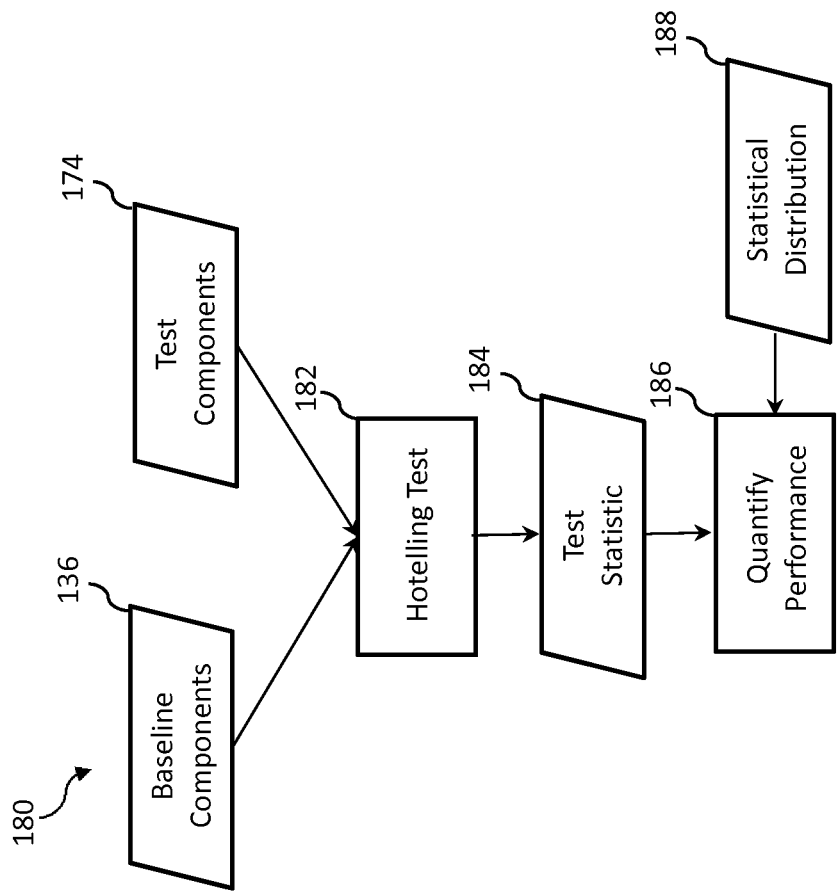
FIG. 8 is a schematic depicting a method for performing a statistical comparison according to one or more embodiments shown and described herein.

Referring now to FIG. 8, the baseline components 136 and the test components 174 may be compared to using a statistical comparison to evaluate the system performance of the test system. According to the embodiments described herein, a method 180 may be executed automatically to perform a statistical comparison. The method 180 may include a process 182 for performing a Hotelling $T^2$ test. In some embodiments, the baseline components 136 and the test components 174 may be input to the Hotelling $T^2$ test in SPCA space such that the Hotelling $T^2$ test performs a multivariate statistical test to evaluate if the test system performance is consistent with the baseline performance.

The Hotelling $T^2$ test may generate a test statistic 184, which is given by Equation (1).

$$T^2 = (\bar{\mu}_{Test} - \bar{\mu}_{Baseline})^T \Sigma^{-1} (\bar{\mu}_{Test} - \bar{\mu}_{Baseline}) \quad \text{Equation (1)}$$

In Equation (1) the test statistic 184 is given by $T^2$, where $\bar{\mu}_{Test}$ is the mean vector for the test components 174, $\bar{\mu}_{Baseline}$ is the mean vector for the baseline components 136, and $\Sigma$ is the estimated covariance matrix.

$$\Sigma = \left(\frac{1}{n_{Baseline}} + \frac{1}{n_{Test}}\right)\Sigma_{Statistical} + \left(1 + \frac{1}{n_g}\right)\Sigma_{Systematic} \quad \text{Equation (2)}$$

The systematic variance may be included in $\Sigma^{-1}$ by defining the estimated covariance matrix according to Equation (2), where the statistical covariance matrix $\Sigma_{Statistical}$ is given by Equation (3), the systematic covariance matrix $\Sigma_{Systematic}$ is given by Equations (4) and (5), $n_{Baseline}$ is the number of baseline systems, and $n_{Test}$ is the number of test systems.

$$\Sigma_{Statistical} = \quad \text{Equation (3)}$$
$$\frac{1}{n_{Baseline} + n_{Test} - 2}((n_{Baseline} - 1)\Sigma_{baseline} + (n_{Test} - 1)\Sigma_{test})$$

In Equation (3), the baseline covariance matrix $\Sigma_{Baseline}$ may be calculated from the baseline components 136 and the test covariance matrix $\Sigma_{Test}$ may be calculated from the test components 174. For example, the components may be defined as the eigenvalues of the associated covariance matrix.

$$\Sigma_{Systematic}(k, k) = \frac{\sum_{i=1}^{n_g}(\overline{\mu_i(k)} - \overline{\mu_p(k)})^2}{n_g - 1} \quad \text{Equation (4)}$$

$$\Sigma_{Systematic}(k, l) = 0 \quad (k \neq l) \quad \text{Equation (5)}$$

The systematic covariance matrix $\Sigma_{Systematic}$ may be assumed to be a diagonal matrix given by Equations (4) and (5), whose elements are the between group variance observed in the baseline dataset and where $n_g$ is the total number of systems, and $\mu_p$ is the average of all of the systems. The addition of the systematic covariance matrix $\Sigma_{Systematic}$ may effectively lessen the weight of observables which vary significantly between daily operations.

Figure 6:
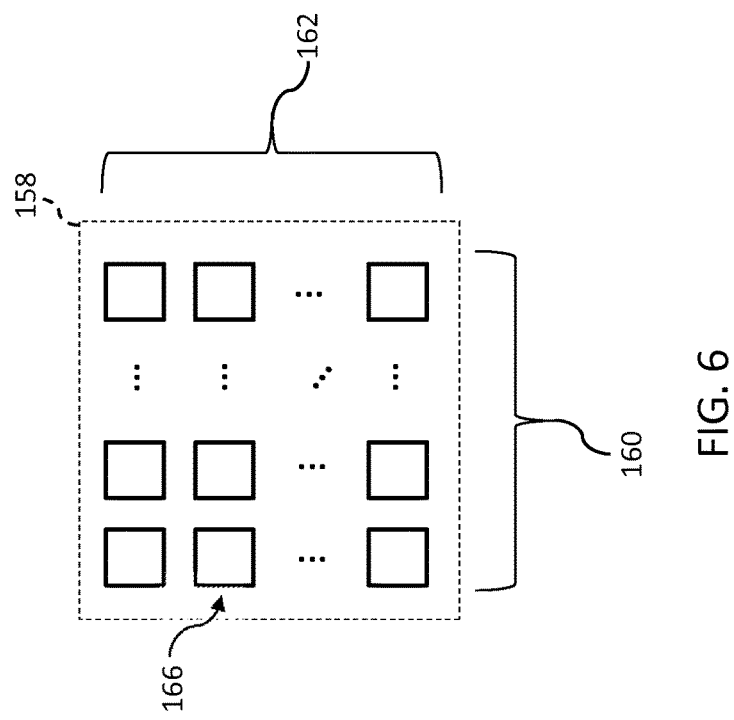
FIG. 6 is a schematic depicting a test data set according to one or more embodiments shown and described herein.

Referring collectively to FIGS. 3, 6, and 8, the method may include a process 186 for quantifying system performance. Specifically, the test statistic 184 may be compared to a statistical distribution 188. For example, in cases where the baseline data set 128 and the test data set 158 are normally distributed, i.e., follow a normal distribution, the test statistic 184 may be characterized by an F-distribution. The F-distribution may be given by $T^2 \approx F(p,n)$, where p is the number of SPCA parameters and n is the number of degrees of freedom n given by $n_{Baseline}+n_{Test}+p-1$. Accordingly, statistical cutoff values may be placed on the test statistic 184 to characterize the performance of the test system. For example, as the value of the test statistic 184 increases, the probability that the test system is operating like a baseline system, i.e., like a good performing system, becomes less likely.

In some embodiments, the test statistic 184 may be compared to the statistical distribution 188 to generate a p-value. The p-value may be compared to one or more threshold values to characterize system performance. In one embodiment, three categories may be defined according to threshold values of about 0.01 and about 0.05. Specifically, a green category may correspond to a properly functioning test system, a yellow category may correspond to a test system that may not be operating properly, and a red category may correspond to a test system that is not operating properly. A test system generating a test statistic 184 having a p-value greater than about 0.05 may be classified as green. A test system generating a test statistic 184 having a p-value between about 0.01 and about 0.05 may be classified as yellow. Assuming that all terms are normally distributed and the statistical and systematic sources have been fully accounted for, roughly one in twenty of runs under normal operating conditions should produce a yellow result. A test system generating a test statistic 184 having a p-value less than about 0.01 may be classified as red. If all sources of variance have been correctly assigned, only one out of 1000 runs should produce such a result under normal operating conditions.

As is described above, the Hotelling $T^2$ test assumes that the distributions of the system variables are normally distributed and uncorrelated. In some embodiments, the system variables may be correlated and not follow a normal distribution such as, for example, metrics defined by the ANSI N42.45-2011 standard may measure similar properties and thus, be highly correlated. In practice, it was observed that the system variables demonstrated deviation from normality. It was discovered that the deviation may be attributed to skewed distributions, multimodal distributions, or distributions with a high number of outliers (i.e., observations in the tails of the distributions). To adjust for the deviation, the statistical distribution 188 may be determined empirically in the alternative of using a standard distribution. That is, the test statistic 184 may be compared to an empirical test distribution to evaluate the quality of the test system.

Referring collectively to FIGS. 2, 5, and 8, according to the embodiments described herein, the empirical distribution may be derived using the baseline measurements 124. For example, a subset of the baseline measurements 124 may be compared to the remainder of the baseline measurements 124. Specifically, the subset of the baseline measurements 124 may be used, instead of the test measurements 154, to generate the test components 174, as described in method 150, and the remainder of the baseline measurements 124 may be used to generate the baseline components 136, as described in method 120. A test statistic 184 based only upon the baseline measurements 124 may be generated. The process may be repeated to generate sufficient test statistics 184 from only upon baseline measurements 124 to map to an empirical dataset indicative of good performance. In some embodiments, the empirical distribution may be modified by removing large system outliers (e.g., more than ten standard deviations from nominal).

Alternatively or additionally, the thresholds based on the F-distribution may be replaced with new thresholds based on percentiles of the empirical distribution. For example, the empirical distribution may be divided into groups of percentages (i.e., a histogram) that are separated by quantiles. In one embodiment, the values associated with the desired quantiles of the empirical distribution may be used as the thresholds. Generally, the empirical distribution based thresholds are less stringent than the F-distribution. However, it has been discovered that the empirical distribution based thresholds better reflect the observed distribution of the data than the F-distribution for cases where the normality assumptions behind the F-distribution are not valid.

Referring collectively to FIGS. 3, 5, 6, and 8, the test data set 158 may be transformed into the modified test data set 170 according to process 164. The process 164 may include selecting the identified test variable 166. In some embodiments, the identified test variable 166 may be automatically selected, when the identified test variable 166 corresponds to a system variable indicative of improved quality. For example, when evaluating X-ray images some differences in mean metrics are indicative of improved image quality. In the example of a smaller standard deviation than the baseline, the smaller standard deviation may be indicative of less noise, i.e., better image quality. With reference to Equation (1), the Hotelling $T^2$ test does not differentiate between desired and undesired changes. Specifically, the difference in mean is squared, i.e. the inverse covariance matrix $\Sigma^{-1}$ is multiplied on both the left and the right side of Equation (1) by the difference in mean. By definition, the mean difference squared is non-negative. The difference in mean always adds a positive (or zero) quantity to the test statistic 184. Accordingly, even differences indicative of improved quality penalize the test statistic 184 and make the test statistic 184 more likely to fail at process 186. In practice, differences indicative of improved quality may cause systems with less noise, i.e., improved quality, to be rejected due to the inability of the Hotelling $T^2$ test to distinguish between differences indicative of improved performance and differences indicative of degraded performance.

In some embodiments, improved quality candidates and an improved quality metric (e.g., an absolute value or a delta) may be identified prior to the execution of process 164. Process 164 may be executed automatically, to compare the test system variables 162 to the improved quality candidates. Likewise, the mean of the test system variables 162 or the delta of the mean of the test system variables 162 from the mean of the baseline system variables 132 may be compared to the improved quality metric. Accordingly, the identified test variable 166 may be automatically selected, when the identified test variable 166 corresponds to a system variable indicative of improved quality. By selecting the identified test variable 166 corresponding to a system variable indicative of improved quality and shifting each instance 160 such that the mean of the identified test variable 166 is substantially equal to the mean of the corresponding baseline variable 142, the embodiments described herein may remove the inherent penalty the Hotelling $T^2$ test. Moreover, by shifting the data rather than simply replacing the mean, the penalty of the average may be mitigated while the impact of the variance may be maintained.

Referring still to FIGS. 3, 5, 6, and 8, the identified test variable 166 may be automatically selected, when the mean of the identified test variable 166 differs from the mean of the corresponding baseline variable 142 by a practically insignificant difference. An issue with the t-test and by extension the Hotelling $T^2$ test is that a magnitude of a minimal detectable difference of the Hotelling $T^2$ test is dependent on the sample size, i.e., as the sample size increases the magnitude of the minimal detectable difference decreases. Accordingly, if the means of two distributions are not identically the same, the test will find a difference in means larger than the magnitude of the minimal detectable difference to be statistically significantly different if the sample size is sufficiently large. However, the magnitude of the minimal detectable difference may be less than a practically significant difference, i.e., the Hotelling $T^2$ test may be overly sensitive to changes in the data. Specifically, the Hotelling $T^2$ test may be considered as combining multiple tests into a single test. The combination of several statistically significant, but practically insignificant mean differences may result in a test statistic 184 that is more likely to fail.

The practically insignificant difference may be identified by determining the sensitivity of the system performance to Hotelling $T^2$ test. In some embodiments, the practically significant difference may be determined empirically. Specifically, ranges of test system variables 166 may be used to generate test components 174, i.e., empirical data sets may be input directly to process 174. The resulting test statistics 184 may be observed to determine a range of values that provide similar resulting test statistics 184. For example, the practical significant difference may be defined as a pre-defined percentage of difference from the mean of the corresponding baseline variable 142. Thus, the identified test variable 166 may be selected, when the mean of the identified test variable 166 is within the pre-defined percentage from the mean of the corresponding baseline variable 142. In further embodiments, practically significant difference may be based on other performance measures as appropriate and available. By selecting the identified test variable 166 having a mean that differs from the mean of the corresponding baseline variable 142 by a practically insignificant difference and shifting each instance 160 such that the mean of the identified test variable 166 is substantially equal to the mean of the corresponding baseline variable 142, the embodiments described herein may make the Hotelling $T^2$ test less sensitive to insignificant changes in data. Moreover, by shifting the data rather than simply replacing the mean, the sensitivity may be improved while the impact of the variance may be maintained.

Referring collectively to FIGS. 1, 2, 5, and 8, it is noted that the method 120, the method 150, the method 180, or a combination thereof may be automatically executed by the one or more processors 102 of the system 100. Without departing from the scope of this disclosure, each of the method 120, the method 150, the method 180, or any process thereof may be performed on separate appliances or systems. In one embodiment, the method 120 may be executed automatically by one or more processors 102 of one or more baseline systems including the system 100, and the method 150 and the method 180 may be executed automatically by one or more processors 102 by a test system including the system 100. Accordingly, the baseline measurements 124, the baseline data set 128, the baseline components 136, or any combination thereof may be provided upon memory 104 of the test system. Alternatively or additionally, the test system may be communicatively coupled to the one or more baseline systems, a server, or any other device capable of providing the baseline measurements 124, the baseline data set 128, the baseline components 136 to the test system.

Figure 9:
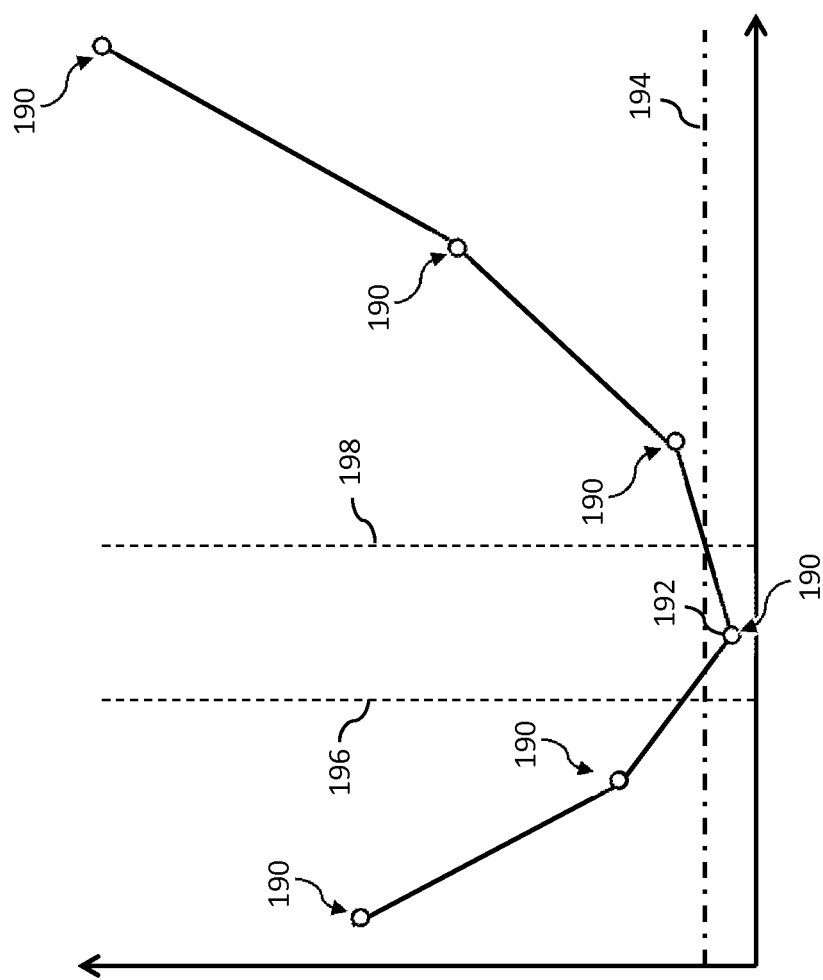
FIG. 9 is a graphic depicting a plurality of data sets compared to an empirically determined threshold for a test statistic according to one or more embodiments shown and described herein.

Referring collectively to FIGS. 8 and 9, the performance of the embodiments described herein were validated using CT data. A plurality of data sets 190, which were collected using a nominal X-ray CT EDS, are graphically depicted in FIG. 9. The abscissa represents the magnitude of a system variable (e.g., belt speed setting) and the ordinate represents the magnitude of the test statistic 188. Each data set 190 was collected after incrementally modifying a system variable, the belt speed setting of the X-ray CT EDS, with respect to a nominal value. The nominal data set 192 was collected using the X-ray CT EDS with the nominal belt speed. Line 194 depicts the empirically determined threshold for the test statistic 188. Line 196 depicts the lower bounds for nominal belt speed, and line 198 depicts the upper bounds for nominal belt speed. As depicted in FIG. 9, the nominal data set 192 was within the empirically determined threshold for the test statistic 188, i.e., below line 194. Each of the data sets 190 below the lower bounds (left side of line 196) and above the upper bounds (right side of line 198) are outside of the empirically determined threshold for the test statistic 188, i.e., above line 194.

It should now be understood that the embodiments described herein may evaluate system performance using SPCA and a modified version of the Hotelling $T^2$ test. The modifications to Hotelling $T^2$ test may include the use of empirically derived distributions for determining thresholds and shifting the data to constrain the Hotelling $T^2$ test to practically meaningful differences that degrade system performance. The embodiments described herein were validated by injecting a series of faults in voltage, current, detectors, gantry, belt speed, and voltage/current combinations into X-ray CT EDS. An unmodified or conventional Hotelling $T^2$ test produced results that were generally noisy (i.e., the statistic would both increase and decrease as fault intensity increased) and included a number of false positives (i.e., failures with no faults introduced). The embodiments described herein with the modified version of the Hotelling $T^2$ test produced a more useful and stable test statistic. Instead of producing noisy results, the test statistic exhibited little noise. Indeed, the test statistic responded rapidly with dramatic increases in response to relatively large faults. Instead of generating a large number of false positives, the test statistic generally passes on nominal inputs and small introduced faults.

It is noted that the terms "substantially" and "about" may be used herein to represent the inherent degree of uncertainty that may be attributed to any quantitative comparison, value, measurement, or other representation. These terms are also used herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be used in combination. It is therefore intended that the appended claims cover all such changes and modifications that are within the scope of the claimed subject matter.

What is claimed is:

1. A method for evaluating system performance, the method comprising:
    collecting test measurements of a calibration standard with a sensor of a system such that the test measurements correspond to same data as baseline measurements;
    transforming, automatically with one or more processors, the test measurements into a test data set, wherein the test data set comprises a matrix having multiple instances arranged as columns of the matrix and test system variables arranged as rows of the matrix, and wherein each of the instances of the test system variables corresponds to a single test measurement instance and the test system variables correspond to same type of variable used as one of baseline system variables in the baseline measurements;
    comparing, automatically with the one or more processors, a test average of the instances of a variable of the test system variables to a baseline average of corresponding instances of a corresponding baseline variable in the baseline measurements;
    determining a shift amount as a difference between the test average of the instances of a variable of the test system variables and the baseline average of corresponding instances of a corresponding baseline variable in the baseline measurements;
    setting the shift amount to the instances of the variable of the test system variables when the test average differs from the baseline average by less than a predetermined threshold difference, otherwise setting the shift amount to zero (0) to preserve a selected instance of the variable of the test system variables;
    shifting data for each corresponding instance of the variable of the test system variables by the shift amount to generate a modified test data set from the test data set for a Hotelling T2 test;
    transforming, automatically with the one or more processors, the modified test data set with a sparse principal component analysis into test components;
    comparing, automatically with the one or more processors, the test components to baseline components using the Hotelling T2 test to generate a Hotelling T2 statistic; and
    quantifying performance of the system based upon the Hotelling T2 statistic.

2. The method of claim 1, comprising selecting the variable of the test system variables, when the variable is indicative of quality of performance including level of variation.

3. The method of claim 2, comprising:
    comparing the variable of the test system variables to the corresponding baseline variable; and
    determining that the baseline variable is indicative of the quality of performance based upon a decrease relative to the baseline variable.

4. The method of claim 1, wherein the predetermined threshold difference is a pre-defined percentage of the baseline average.

5. The method of claim 1, wherein the shift amount is a delta of the test average and the baseline average.

6. The method of claim 1, wherein a modified test average of the variable of the modified test system variables is the same as the baseline average.

7. The method of claim 1, wherein the performance of the system is quantified by comparing the Hotelling T2 statistic to a statistical distribution.

8. The method of claim 7, wherein the statistical distribution is an empirical distribution derived from baseline measurements of baseline systems having a known performance level.

9. The method of claim 8, wherein:
    the test statistic is compared to a threshold of the empirical distribution, and the threshold is computed from a quantile of the empirical distribution.

10. A method for evaluating system performance, the method comprising:
    providing a test data set, wherein: the test data set comprises a matrix having multiple instances arranged as columns of the matrix and test system variables arranged as rows of the matrix, and each of the instances of the test system variables corresponds to a single test measurement instance and the test system variables correspond to same type of variable used as one of baseline system variables in the baseline measurements;
    selecting, automatically with one or more processors, a variable of the test system variables, when the variable of the test system variables is indicative of quality, or when a test average of the instances of the variable of the test system variables differs from a baseline average of corresponding instances of a corresponding baseline variable in the baseline measurements by less than a predetermined threshold difference;
    determining a shift amount as a difference between the test average of the instances of a variable of the test system variables and the baseline average of corresponding instances of a corresponding baseline variable in the baseline measurements;
    setting the shift amount to the instances of the variable of the test system variables, when the test average differs from the baseline average by less than the predetermined threshold difference, otherwise setting the shift amount to zero (0) to preserve a selected instance of the variable of the test system variables;
    shifting, automatically with the one or more processors, data for each corresponding instance of the variable of the test system variables by the shift amount to generate a modified test data set from the test data set for a Hotelling T2 test;
    transforming, automatically with the one or more processors, the modified test data set with a sparse principal component analysis into test components;
    comparing, automatically with the one or more processors, the test components to baseline components using the Hotelling T2 test to generate a Hotelling T2 statistic; and
    quantifying performance of the system based upon the Hotelling T2 statistic.

11. The method of claim 10, wherein the predetermined threshold difference is a pre-defined percentage of the baseline average.

12. The method of claim 10, wherein the shift amount is a delta of the test average and the baseline average.

13. The method of claim 10, wherein a modified test average of the variable of the modified test system variables is the same as the baseline average.

14. The method of claim 10, wherein:
    the performance of the system is quantified by comparing the test statistic to a statistical distribution, and
    the statistical distribution is an empirical distribution derived from baseline measurements of baseline systems having a known performance level.

15. The method of claim 14, wherein:
the test statistic is compared to a threshold of the empirical distribution, and the threshold is computed from a quantile of the empirical distribution.

16. A system capable of evaluating system performance, the system comprising:
a sensor communicatively coupled to one or more processors;
memory communicatively coupled to the one or more processors, wherein the memory comprises machine readable instructions that are executed by the one or more processors to:
collect test measurements of a calibration standard with the sensor of the system such that the test measurements correspond to same data as baseline measurements;
transform the test measurements into a test data set, wherein:
the test data set comprises a matrix having multiple instances arranged as columns of the matrix and test system variables arranged as rows of the matrix, and wherein each of the instances of the test system variables corresponds to a single test measurement instance and the test system variables correspond to same type of variable used as one of baseline system variables in the baseline measurements;
compare a test average of the instances of a variable of the test system variables to a baseline average of corresponding instances of a corresponding baseline variable in the baseline measurements:
determining a shift amount as a difference between the test average of the instances of a variable of the test system variables and the baseline average of corresponding instances of a corresponding baseline variable in the baseline measurements;
setting the shift amount to the instances of the variable of the test system variables, when the test average differs from the baseline average by less than a predetermined threshold difference, otherwise setting the shift amount to zero (0) to preserve a selected instance of the variable of the test system variables;
shift data for each corresponding instance of the variable of the test system variables by the shift amount to generate a modified test data set from the test data set for a Hotelling T2 test;
transform the modified test data set with a sparse principal component analysis into test components;
compare the test components to baseline components using the Hotelling T-squared test to generate a Hotelling T2 statistic; and
quantify performance of the system based upon the Hotelling T2 statistic.

17. The system of claim 16, comprising an X-ray source communicatively coupled to one or more processors and configured to emit photons, wherein the sensor is an X-ray detector configured to detect the photons.

18. The system of claim 17, comprising an actuation assembly communicatively coupled to the one or more processors, and configured to manipulate the calibration standard, the sensor, the X-ray source, or a combination thereof.

19. The system of claim 16, wherein the machine readable instructions that are executed by the one or more processors to select the variable of the test system variables, when the variable of the test system variables is indicative of quality, or when the test average differs from the baseline average by less than the predetermined threshold difference.

* * * * *